US012737228B1

(12) United States Patent
Gilboa et al.

(10) Patent No.: US 12,737,228 B1
(45) Date of Patent: Sep. 15, 2026

(54) PATTERN SIMILARITY DETECTION FOR CLOUD RESOURCE ANOMALY ANALYSIS

(71) Applicant: Finout Ltd, Tel Aviv (IL)

(72) Inventors: Zohar Yizhar Gilboa, Rehovot (IL); Asaf Josef Liveanu, Herzliya (IL); Roi Rav-Hon, Tel Aviv (IL)

(73) Assignee: Finout Ltd, Tel Aviv (IL)

( * ) Notice: Subject to any disclaimer, the term of this patent is extended or adjusted under 35 U.S.C. 154(b) by 0 days.

(21) Appl. No.: 19/240,076

(22) Filed: Jun. 17, 2025

(51) Int. Cl.
*G06F 9/50* (2006.01)
*G06F 9/451* (2018.01)

(52) U.S. Cl.
CPC ............ *G06F 9/5033* (2013.01); *G06F 9/451* (2018.02)

(58) Field of Classification Search
CPC ........ G06F 9/5033; G06F 9/451; G06F 11/34; G06F 11/3452
See application file for complete search history.

(56) References Cited

U.S. PATENT DOCUMENTS

2015/0106578 A1* 4/2015 Warfield ............... G06F 3/0653 711/158
2016/0210556 A1* 7/2016 Ben Simhon ....... G06F 11/3452
2017/0006135 A1* 1/2017 Siebel ....................... G06F 8/10
2020/0004835 A1* 1/2020 Ramanath ............. G06N 3/088
2020/0285737 A1* 9/2020 Kraus ................... G06F 21/552
2021/0142254 A1* 5/2021 Bougon ................ G06F 9/5077
2022/0026531 A1* 1/2022 Wu ......................... G01S 13/88
2022/0027257 A1* 1/2022 Harutyunyan ...... G06F 11/3452
2023/0007039 A1* 1/2023 Waplington ......... G06N 3/0499
2023/0107337 A1* 4/2023 Toroman ............. G06F 16/2228 702/182
2025/0165717 A1* 5/2025 Burton .................... G06F 40/30
2025/0200245 A1* 6/2025 Cao ......................... G06F 30/20
2025/0371424 A1* 12/2025 Fortkort ................. G06N 20/00
2025/0390352 A1* 12/2025 Crabtree ............... G06F 9/5027
2025/0390498 A1* 12/2025 Turrell .............. G06F 16/24556
2026/0017459 A1* 1/2026 Galvin ................ G06F 16/3325

* cited by examiner

*Primary Examiner* — Kenneth Tang

(57) ABSTRACT

There is provided a method, comprising: receiving a target resource utilization of a computing cloud, generating a target delta time-sequence by computing deltas between time-spaced values of the target resource utilization over a time interval, computing a target vector representation of the target delta time-sequence, generating candidate delta time-sequence for each of the candidate resource utilizations of the computing cloud, each candidate delta time-sequence computed as deltas between time-spaced values of the candidate resource utilization over the time interval, computing candidate vector representations of the candidate delta time-sequences, computing similarity measures, each similarity measure between the target vector representation and a respective candidate vector representation, selecting at least one of the candidate vector representations associated with the similarity measure meeting a requirement, and presenting on a display and within a GUI, at least one candidate resource utilization corresponding to the selected at least one of the candidate vector representations.

18 Claims, 5 Drawing Sheets

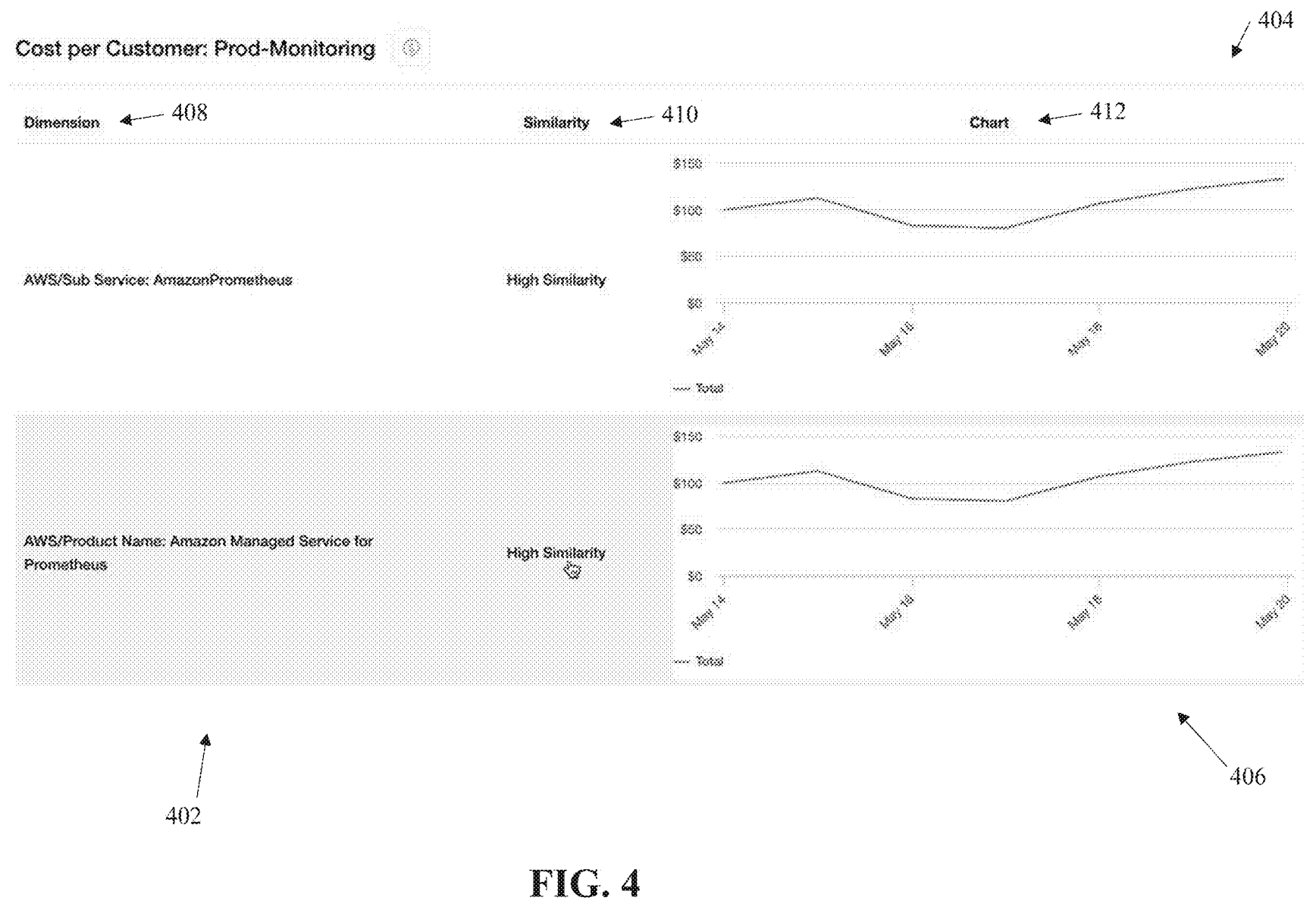

Cost per Customer: Prod-Monitoring

Dimension 408
Similarity 410
Chart 412

AWS/Sub Service: AmazonPrometheus
High Similarity

AWS/Product Name: Amazon Managed Service for Prometheus
High Similarity

Total 404
406
402

FIG. 4

PATTERN SIMILARITY DETECTION FOR CLOUD RESOURCE ANOMALY ANALYSIS

BACKGROUND

The present invention, in some embodiments thereof, relates to computing clouds and, more specifically, but not exclusively, to tools for analyzing resource utilization in computing clouds.

Computing clouds utilize extensive resources (e.g., processors, memory, storage, and network) to service a large number of users. Resource utilization tools are important to understand how to improve efficiency of the cloud-based resources. High utilization improves cost-efficiency, while low utilization may indicate wasted resources.

SUMMARY

According to a first aspect, a computer implemented method of analyzing resource utilization in at least one computing cloud, comprises: receiving a target resource utilization selected from a plurality of resource utilizations of at least one computing cloud, by at least one of via a graphical user interface (GUI) and automatic selection, generating a target delta time-sequence by computing a plurality of deltas between a plurality of time-spaced values of the target resource utilization over a time interval, computing a target vector representation of the target delta time-sequence, generating a plurality of candidate delta time-sequence for each of a plurality of candidate resource utilizations of the at least one computing cloud, each candidate delta time-sequence computed as a plurality of deltas between a plurality of time-spaced values of the candidate resource utilization over the time interval, computing a plurality of candidate vector representations of the plurality of candidate delta time-sequences, computing a plurality of similarity measures, each similarity measure between the target vector representation and a respective candidate vector representation, selecting at least one of the candidate vector representations associated with the similarity measure meeting a requirement, and presenting on a display and within the GUI, at least one candidate resource utilization of the plurality of candidate resource utilizations corresponding to the selected at least one of the candidate vector representations.

According to a second aspect, system for analyzing resource utilization in at least one computing cloud, comprises: at least one processor executing a code for: receiving a target resource utilization selected from a plurality of resource utilizations of at least one computing cloud, by at least one of via a graphical user interface (GUI) and automatic selection, generating a target delta time-sequence by computing a plurality of deltas between a plurality of time-spaced values of the target resource utilization over a time interval, computing a target vector representation of the target delta time-sequence, generating a plurality of candidate delta time-sequence for each of a plurality of candidate resource utilizations of the at least one computing cloud, each candidate delta time-sequence computed as a plurality of deltas between a plurality of time-spaced values of the candidate resource utilization over the time interval, computing a plurality of candidate vector representations of the plurality of candidate delta time-sequences, computing a plurality of similarity measures, each similarity measure between the target vector representation and a respective candidate vector representation, selecting at least one of the candidate vector representations associated with the similarity measure meeting a requirement, and presenting on a display and within the GUI, at least one candidate resource utilization of the plurality of candidate resource utilizations corresponding to the selected at least one of the candidate vector representations.

According to a third aspect, a non-transitory medium storing program instructions for analyzing resource utilization in at least one computing cloud, comprising program instructions which when executed by at least one processor, cause the at least one processor to: receive a target resource utilization selected from a plurality of resource utilizations of at least one computing cloud, by at least one of via a graphical user interface (GUI) and automatic selection, generate a target delta time-sequence by computing a plurality of deltas between a plurality of time-spaced values of the target resource utilization over a time interval, compute a target vector representation of the target delta time-sequence, generate a plurality of candidate delta time-sequence for each of a plurality of candidate resource utilizations of the at least one computing cloud, each candidate delta time-sequence computed as a plurality of deltas between a plurality of time-spaced values of the candidate resource utilization over the time interval, compute a plurality of candidate vector representations of the plurality of candidate delta time-sequences, compute a plurality of similarity measures, each similarity measure between the target vector representation and a respective candidate vector representation, select at least one of the candidate vector representations associated with the similarity measure meeting a requirement, and present on a display and within the GUI, at least one candidate resource utilization of the plurality of candidate resource utilizations corresponding to the selected at least one of the candidate vector representations.

In a further implementation form of the first, second, and third aspects, the similarity measure is computed by implicitly assigning a greater weight to a multi-dimensional angle between the target vector representation and the respective candidate vector representation and assigning a lower weight to a normal of the target vector representation and/or the respective candidate vector representation, which implies a greater weight to a change pattern and less weight to a size of the changes.

In a further implementation form of the first, second, and third aspects, the similarity measure comprises a cosine distance.

In a further implementation form of the first, second, and third aspects, the similarity measure is mathematically represented as: similarity_score=TRUNC ((1−cos_dist_deltas) *100, 4), wherein similarity_score denotes the similarity measure, and cos_dist_deltas denotes the cosine distance between the target vector representation and one of the plurality of candidate vector representations.

In a further implementation form of the first, second, and third aspects, further comprising: computing a target absolute vector representation of absolute values of the plurality of time-spaced values of the target resource utilization, computing a plurality of candidate absolute vector representations of absolute values of the plurality of time-spaced values of the candidate resource utilizations, computing a second similarity measure between the target absolute vector representation and the plurality of candidate absolute vector representations, wherein the similarity measure comprises a first similarity measure, computing a combined similarity measure as a combination of the first similarity measure and the second similarity measure, wherein comprises selecting at least one of the candidate vector representations associated with the combined similarity measure meeting a second requirement.

In a further implementation form of the first, second, and third aspects, the combined similarity measure is mathematically represented as: dist_func=cos_dist*cos_dist_deltas, wherein: dist_func denotes the combined similarity measure, cos_dist denotes the second similarity measure, and cost_dist_deltas denotes the first similarity measure.

In a further implementation form of the first, second, and third aspects, the plurality of deltas are between consecutive time-spaced values.

In a further implementation form of the first, second, and third aspects, each of the target vector representation and the plurality of candidate vector representations denote a rate of change and/or a direction of change of the corresponding time-space values of the corresponding resource utilization.

In a further implementation form of the first, second, and third aspects, further comprising classifying each similarity measure of the plurality of similarity measures into a category of a plurality of categories, wherein the at least one candidate vector representation associated with the category matching the requirement defining at least one category is selected and presented.

In a further implementation form of the first, second, and third aspects, the target resource utilization is automatically selected in response to automatically detecting an anomaly of resource utilization that exceeds a predicted value or exceeds a predefined value.

In a further implementation form of the first, second, and third aspects, the target resource utilization is iteratively selected from the plurality of resource utilizations, wherein during each iteration another resource utilization is defined as the target resource utilization, wherein the iterations terminate when the similarity measure is computed for a defined amount of pairs of the plurality of resource utilizations.

In a further implementation form of the first, second, and third aspects, further comprising filtering out values of candidate resource utilizations associated with a difference in magnitude below a threshold relative to values of the target resource utilization.

In a further implementation form of the first, second, and third aspects, further comprising filtering out candidate resource utilizations associated with the similarity measure below a threshold.

In a further implementation form of the first, second, and third aspects, further comprising: generating an event tag for the candidate resource utilization corresponding to the at least one candidate resource utilization of the plurality of candidate resource utilizations corresponding to the selected at least one of the candidate vector representations.

In a further implementation form of the first, second, and third aspects, further comprising presenting within the GUI, an overlay of the plurality of time-spaced values of the target resource utilization time correlated with the plurality of time-spaced values of the selected at least one candidate resource utilization.

In a further implementation form of the first, second, and third aspects, the resource associated with the target resource utilization is of a different type than the resource associated with the selected candidate resource utilization.

In a further implementation form of the first, second, and third aspects, the plurality of time-spaced values of the target resource utilization and the plurality of time-spaced values of the candidate resource utilization are obtained by a processor querying each respective resource to obtain the corresponding utilization of the respective resource.

In a further implementation form of the first, second, and third aspects, each of the target resource utilization and the plurality of candidate resource utilizations comprises a cost of using a certain resource.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 4 is a schematic of an exemplary user interface presenting candidate resource utilization having patterns similar to the resource utilization depicted in FIG. 3, in accordance with some embodiments of the present invention.

DETAILED DESCRIPTION

Figure 1:
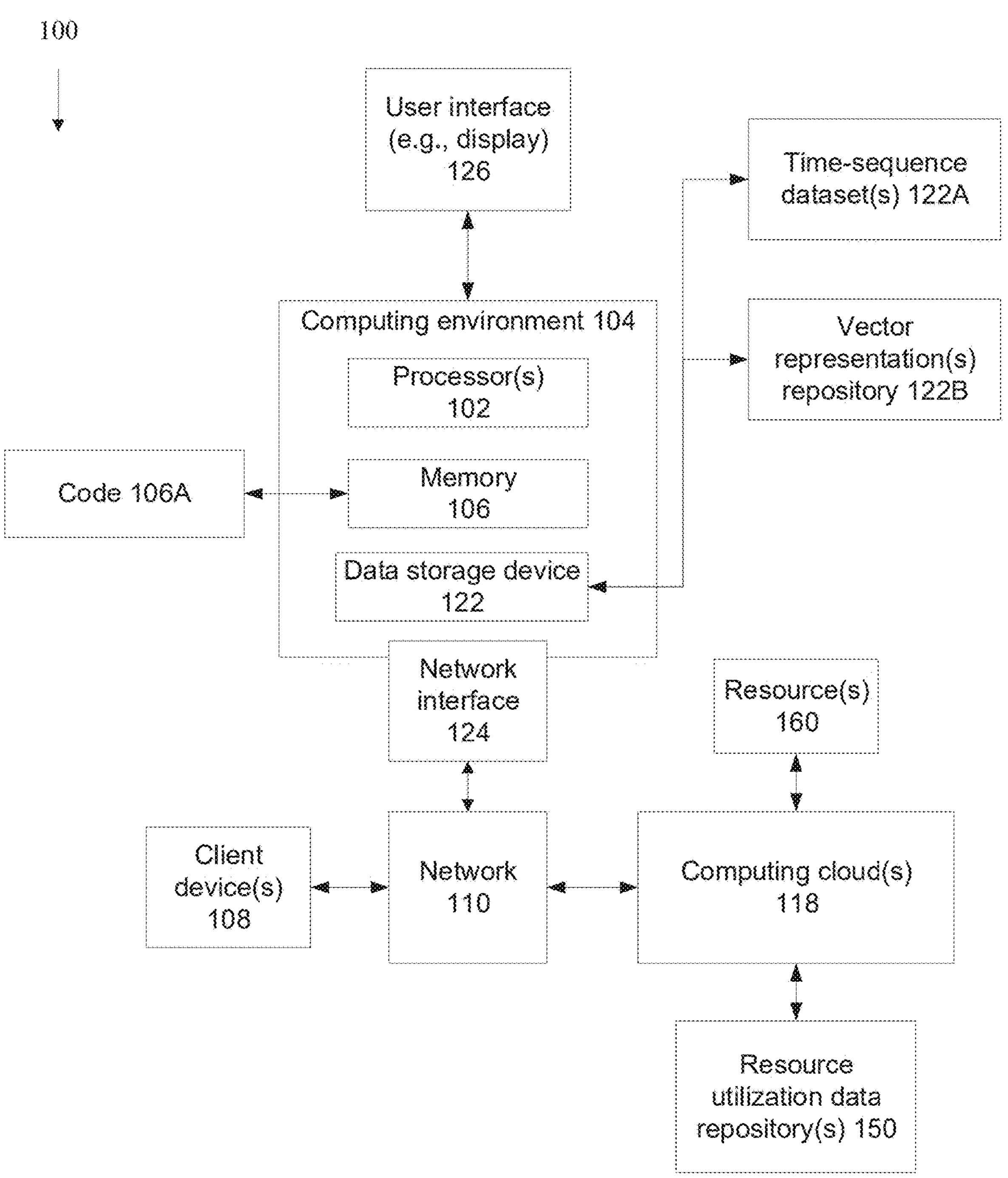
FIG. 1 is a block diagram of components of a system for analyzing utilization of resources of at least one computing cloud, in accordance with some embodiments of the present invention.

The present invention, in some embodiments thereof, relates to computing clouds and, more specifically, but not exclusively, to tools for analyzing resource utilization in computing clouds.

An aspect of some embodiments of the present invention relates to systems, methods, computing devices, and/or code instructions (e.g., stored on a data storage device and executable by one or more processors) for analyzing resource utilization in one or more computing clouds. A target resource utilization is selected from multiple different resource utilizations of one or more computing clouds. For example, amount of used storage, processor utilization, amount of used bandwidth, and the like. The target resource utilization may include a cost of the resource utilization, for example, cost of the used storage, cost of the utilized processor, cost of the used bandwidth, and the like. The target resource utilization may be selected, for example, by a user via a graphical user interface (GUI) and/or by automatic selection such by automatically detecting that the target resource utilization is anomalous such due to a higher actual utilization than predicted. A target delta time-sequence is generated by computing deltas between (optionally sequential) time-spaced values of the target resource utilization over a time interval. A target vector representation of the target delta time-sequence is computed. Multiple candidate delta time-sequence are computed for each one of multiple candidate resource utilizations of the computing cloud(s). Each candidate delta time-sequence is computed as deltas between (optionally sequential) time-spaced values of the candidate resource utilization over the time interval. The candidate resource utilizations may be types of resources that are different than the target resource utilization. Multiple candidate vector representations of the candidate delta time-sequences are computed. A similarity measure is computed between the target vector representation and each respective candidate vector representation. The similarity measure may be computed by implicitly assigning a greater weight to a multi-dimensional angle between the target vector representation and the respective candidate vector representation and a lower weight to a normal of the target vector representation and/or the respective candidate vector representation, which implies a greater weight to a change pattern and less weight to a size of the changes. In an exemplary implementation, the similarity measure includes a cosine distance between the vector representations of the delta time-sequences of the target resource utilization and between the respective candidate vector representations of the candidate delta time-sequences. One or more candidate vector representations associated with the similarity measure meeting a requirement are selected, for example, highest ranked similarity measure and/or similarity measure above a threshold indicating high similarity. The candidate resource utilization(s) corresponding to the selected candidate vector representation(s) is/are provided, for example, presented on a display, tagged, and/or fed into another process for further analysis.

At least one embodiment described herein addresses the technical problem of analyzing utilization of resources (i.e., resource utilizations) of a computing cloud(s). Different actions may be taken based on the analysis, for example, as described herein. At least one embodiment described herein improves the technology of a computing cloud, by providing tools for analyzing utilization of resources (i.e., resource utilizations) of the computing cloud(s). At least one embodiment described herein improves upon prior approaches of analyzing computing clouds. At least one embodiment described herein provides the practical application of identifying one or more candidate resource utilizations of a computing cloud that have a similar temporal pattern to a target resource utilization of the computing cloud. Action may be taken based on the identified candidate resource utilizations, for example, as described herein.

The aforementioned technical problem is solved by, and/or the aforementioned technology is improved by, and/or the aforementioned prior approach is improved over by, and/or the aforementioned technical application is obtained by, using a similarity measure computed between the target vector representation of the delta time-sequences of the target resource utilization and each respective candidate vector representation of the candidate delta time-sequences of the candidate resource utilizations. The similarity measure may include a cosine distance. One or more candidate vector representations associated with the similarity measure meeting a requirement are selected. The candidate resource utilization(s) corresponding to the selected candidate vector representation(s) are provided.

Using at least one embodiment described herein, candidate resource utilizations which have change patterns that are similar to the target resource utilization may be found, even when the utilizations refer to different types of resources which would otherwise not be considered as being related to each other. The identification of the candidate resource utilizations may help determine the root cause of increases in resource utilizations. For example, an anomaly in terms of increasingly large storage utilization is identified. A pattern of increased calls to a certain API is identified using at least one embodiment described herein. An analysis may determine that an entity (e.g., human user, bot, malware, application) is making repeated calls to the certain API to obtain data, and then storing the data, leading to the large storage utilization.

Computation of the vector representation(s) as described herein enables using vector comparison approaches, such as the (precise) similarity measurements between different resource utilization (e.g., cost) patterns described herein. The similarity measurements may be used for facilitating the identification of correlations that might not be apparent through traditional analysis methods.

At least embodiment described herein implements a delta-based pattern recognition process. Instead of solely comparing absolute values (e.g., resource utilization, cost), the changes (i.e., deltas) between consecutive data points are analyzed. Analyzing the deltas may be used for emphasizing the pattern of change rather than, or in addition to, the magnitude, which may be used to identify similar behavioral patterns even when the absolute values (e.g., resource utilization, cost) differ significantly. A more nuanced understanding of resource utilization (e.g., cost) dynamics and/or improved anomaly correlation may be obtained.

At least embodiment described herein performs a multi-dimensional cosine distance calculation to measure similarity between vectors based on values of resource utilization (e.g., cost) described herein. The distance approach may include both the absolute vector similarity and the delta vector similarity. The aforementioned measurements may be combined to generate a comprehensive similarity score. By utilizing this dual-perspective approach, not only patterns that match in absolute terms are detected, but also patterns that exhibit similar behavioral characteristics over time may be detected.

At least embodiment described herein may utilize a dual vector analysis framework that may combined (e.g., simultaneously evaluate) two aspects of resource utilization (e.g., cost data):

- Absolute Value Vectors: The raw resource utilization (e.g., cost) values may be analyzed (e.g., as primary vectors), for capturing the magnitude and/or overall shape of cost patterns.
- Delta Value Vectors: In parallel, the changes between consecutive data points may be processed, for creating delta vectors that represent the rate and/or direction of cost changes.

The aforementioned dual analysis may improve identification of similarities in overall resource utilization (e.g., cost) levels and/or in the patterns of resource utilization (e.g., cost) changes, which may provide a more comprehensive similarity assessment than single-vector approaches (e.g., only absolute value vectors).

At least one embodiment described herein relates to detecting and analyzing similar cost patterns within cloud resource expenditure data. A vector-based similarity detection process is used for identifying and/or correlating patterns across different cloud resource dimensions, enabling entities to quickly pinpoint the potential root causes of cost anomalies. By leveraging advanced cosine distance measurements between cost vectors and their deltas, resources with identical, near-identical, or similar cost behaviors, are identified, which may be used for providing insight into cloud spending patterns and/or anomalies.

At least one embodiment described herein provides a technical solution to the aforementioned technical problem that enables entities to identify and understand potential root causes of cost anomalies in their cloud infrastructure. A vector-based similarity detection approach may be combined with a visualization layer for providing real-time anomaly correlation across multiple cloud resource dimensions. Similar cost patterns may be detected across different resources, by applying similarity detection to historical data, and/or visualizing correlated cost behaviors. These features may offer entities (e.g., businesses) a level of financial transparency, anomaly investigation efficiency, and/or cost pattern recognition not available in existing approaches. The systems and/or methods described herein are designed to be scalable, and/or for providing significant advantages over existing alternatives, presenting numerous commercial applications for cloud cost management.

The system architecture for a Cost Pattern Similarity Detection System according to at least one embodiment, may be designed for precision, performance, and/or insightful analysis.

At least one embodiment described herein represents a significant advancement in cloud resource utilization (e.g., cost) anomaly analysis. By leveraging vector mathematics and cosine distance computations, correlations between cost patterns that would be difficult or impossible to detect through traditional methods may be identified. Entities may quickly identify potential root causes of resource utilization (e.g., cost) anomalies, understand related resource utilization (e.g., cost) behaviors across different resources, and/or make more informed decisions (e.g., resource allocation decisions, financial decisions) regarding their cloud infrastructure.

The combination of delta-based pattern recognition, multi-dimensional cosine distance calculation, and/or hierarchical similarity classification is designed to provide unprecedented insight into cloud cost dynamics. The approach to resource utilization (e.g., cost) pattern analysis described herein may enable a new level of resource utilization (e.g., financial) transparency and/or control, providing an improved analysis tool for modern cloud resource utilization (e.g., cost) management.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
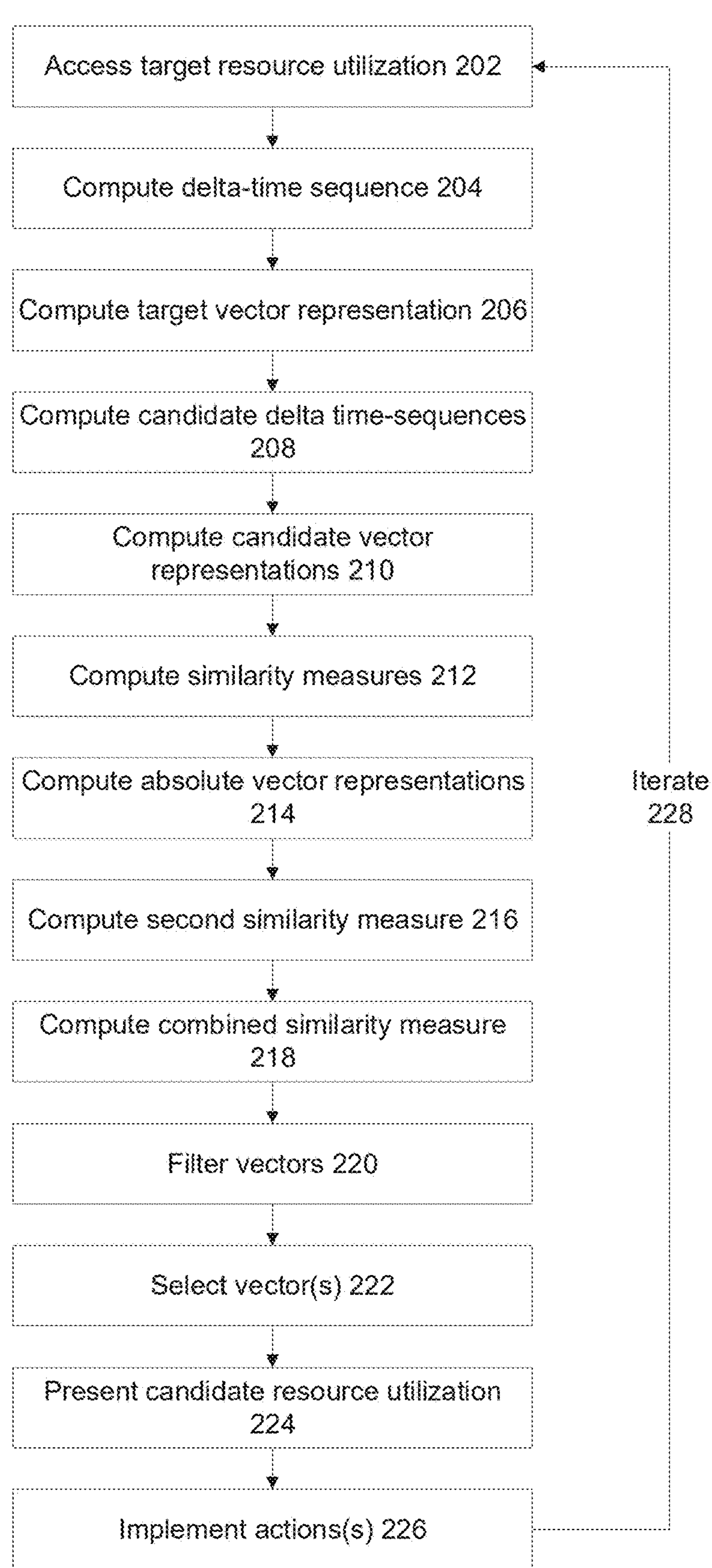
FIG. 2 is a flowchart of a method for analyzing resource utilizations in a computing cloud by using a similarity metric (optionally cosine distance) to identifying similar delta-time sequences of resource utilizations, in accordance with some embodiments of the present invention.
Figure 3:
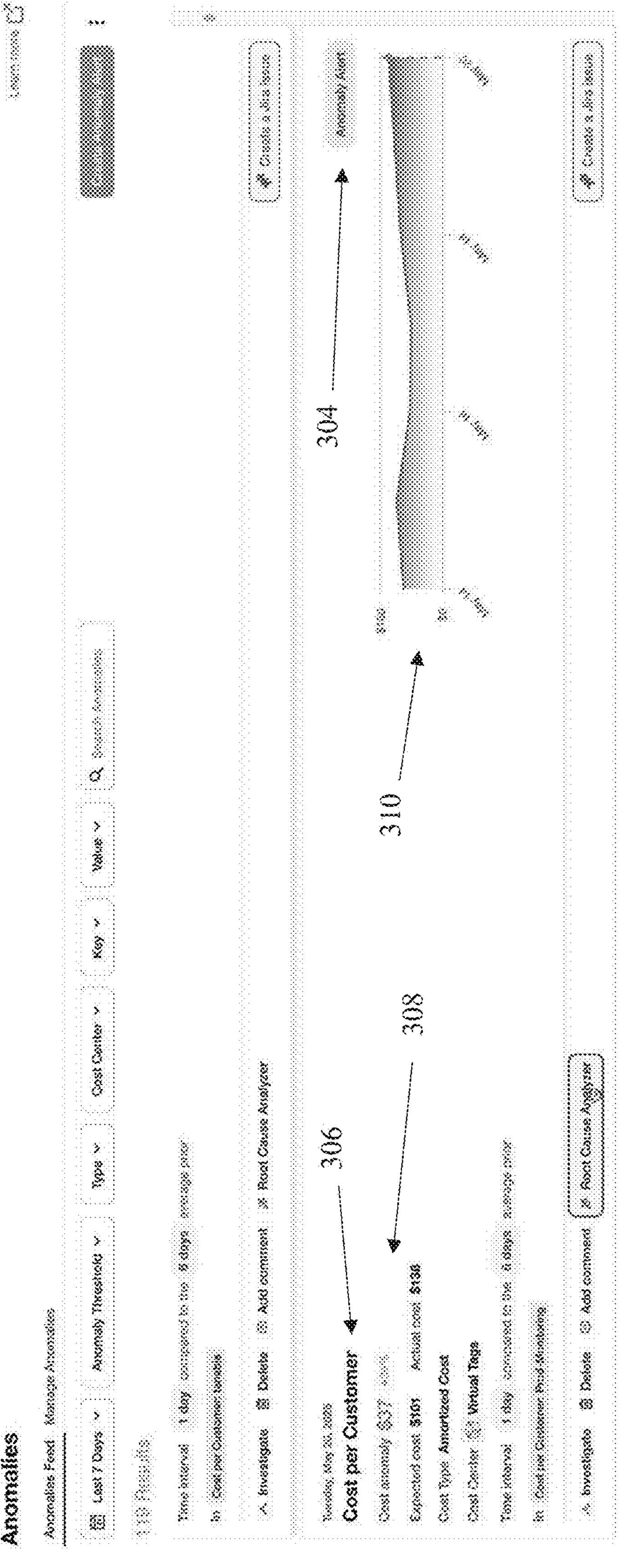
FIG. 3 is a schematic of an exemplary user interface presenting an anomaly in a utilization of a resource, in accordance with some embodiments of the present invention.
Figure 5:
FIG. 5 is a schematic of an exemplary user interface presenting an event tag generated for a candidate resource utilization depicted in FIG. 4, in accordance with some embodiments of the present invention.

Reference is now made to FIG. 1, which is a block diagram of components of a system 100 for analyzing utilization of resources 160 of at least one computing cloud 118, in accordance with some embodiments of the present invention. Reference is also made to FIG. 2, which is a flowchart of a method for analyzing resource utilizations in a computing cloud by using a similarity metric (optionally cosine distance) to identifying similar delta-time sequences of resource utilizations, in accordance with some embodiments of the present invention. Reference is also made to FIG. 3, which is a schematic of an exemplary user interface presenting an anomaly in a utilization of a resource, in accordance with some embodiments of the present invention. Reference is also made to FIG. 4, which is a schematic of an exemplary user interface presenting candidate resource utilization having patterns similar to the resource utilization depicted in FIG. 3, in accordance with some embodiments of the present invention. Reference is also made to FIG. 5, which is a schematic of an exemplary user interface presenting an event tag generated for a candidate resource utilization depicted in FIG. 4, in accordance with some embodiments of the present invention.

Referring now back to FIG. 1, system 100 may implement the acts of the method described with reference to FIG. 2, by processor(s) 102 of a computing environment 104 executing code instructions stored in a memory 106 (also referred to as a program store).

Computing environment 104 may be implemented as, for example one or more and/or combination of: a group of connected devices, a client terminal, a server, a virtual server, a computing cloud, a virtual machine, a desktop computer, a thin client, a network node, and/or a mobile device (e.g., a Smartphone, a Tablet computer, a laptop computer, a wearable computer, glasses computer, and a watch computer).

Computing environment 104 finds similar patterns of resource utilization data (e.g., stored in a resource utilization data repository 150) of resources 160 of computing cloud(s) 118, by computing vector representations of time-sequences of deltas and/or absolute values of resource utilizations 150 of resources 160 and selecting candidate vector representations associated with a similarity measure meeting a requirement, as described herein.

Computing cloud 118 is associated with and/or hosts one or more resources 160 which may be utilized by one or multiple entities, for example, via respective client devices 108.

Resource utilization data repository 150 is set for storing multiple time-spaced values indicating resource utilization of resource(s) 160 associated with computing cloud(s) 118.

Examples of resources 160 include: virtual machines, data storage, network bandwidth, managed databases, and use of software (e.g., software as a service).

Examples of client devices 108 used by one or more different entities to access resources 160 of computing cloud(s) 118 include a client terminal, a server, a desktop computer, and a mobile device.

Computing cloud(s) 118 is not meant to be necessarily limiting, and may be implemented as another platform that hosts services and/or resources which are accessed by multiple users which may be external users (accessing via the network, via a virtual interface such as an application programming interface (API) and the like), for example, a virtual server, a virtual machine, and the like.

Multiple architectures of system 100 based on computing environment 104 may be implemented. For example:

Computing environment 104 executing stored code instructions 106A, may be implemented as one or more servers (e.g., network server, web server, a computing cloud, a virtual server) that provides centralized services to one or more computing clouds 118 and/or client devices 108, for centrally finding similar resource utilization patterns. Services may be provided, for example, to one or more computing clouds(s) 118 and/or client terminal(s) 108 over network 110, by accessing and/or being provided resource utilization data 150 of resources 160 associated with the computing clouds(s) 118. Services may be provided by computing environment 104 to client terminals 108 and/or computing clouds(s) 118, for example, as software as a service (SaaS), a software interface (e.g., application programming interface (API), software development kit (SDK)), an application for local download to the client terminal(s) 108 and/or computing clouds(s) 118, an add-on to a web browser running on client terminal(s) 108 and/or computing clouds(s) 118, and/or providing functions using a remote access session to the client terminals 108 and/or computing cloud(s) 118, such as through a web browser executed by client terminal 108 and/or computing cloud(s) 118 accessing a web sited hosted by computing environment 104. For example, computing environment 104 remotely accesses resource utilization data 150 of computing cloud(s) 118. In yet another example, computing cloud(s) 118 uploads its resource utilization data 150 to computing environment 104.

In another example, computing environment 104 may be implemented to provide dedicated and/or local services to a certain computing cloud 118. For example, computing environment 104 may be integrated with computing cloud 118, such as code 106A of computing environment 104 may be executed by the processor(s) of computing cloud 118 by accessing resource utilization data 150 hosted by computing cloud(s) 118. In another example, computing environment 104 may be implemented as an external device, such as an administrative server, in dedicated communication with computing cloud 118, to provide the services of finding similar patterns in resource utilization data 150.

Processor(s) 102 of computing environment 104 may be hardware processors, which may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogenous or heterogeneous) arranged for parallel processing, as clusters and/or as one or more multi core processing devices.

Memory 106 stores code instructions executable by hardware processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 106 stores code 106A that implements one or more features and/or acts of the method described with reference to FIG. 2 when executed by hardware processor(s) 102.

Computing environment 104 may include a data storage device 122 for storing data, for example, time-sequence dataset(s) 122A set for storing delta and/or absolute time-sequence values, vector representation repository 122B set to store different types of vector representations, and/or other data described herein. Data storage device 122 may be implemented as, for example, a memory, a local hard-drive, virtual storage, a removable storage unit, an optical disk, a storage device, and/or as a remote server and/or computing cloud (e.g., accessed using a network connection).

Network 110 may be implemented as, for example, the internet, a local area network, a virtual network, a wireless network, a cellular network, a local bus, a point to point link (e.g., wired), and/or combinations of the aforementioned.

Computing environment 104 may include a network interface 124 for connecting to network 110, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing environment 104 includes and/or is in communication with one or more user interfaces 126, which may present the identified similar resource utilization patterns and/or other data described herein. User interface 126 may be designed to enable input of data, for example, for selection of the computing cloud(s) 118 and/or resources(s) 160 to analyze. Exemplary user interfaces 126 include, for example, one or more of, a touchscreen, a display, gesture activation devices, a keyboard, a mouse, and voice activated software using speakers and microphone.

Referring now back to FIG. 2, at 202, a target resource utilization is accessed.

The target resource utilization may be selected from multiple resource utilizations of at least one computing cloud. The multiple resource utilizations may be for a specific entity (e.g., organization, server) which may be associated with multiple different users using the resources of the computing cloud(s).

Examples of resources of the computing cloud which are utilized include:

Virtual machines (VM).

Containers.

Serverless functions.

Data storage.

Processing of data.

Virtual Private Clouds (VPCs).

Domain Name System (DNS) services.

Databases.

Applications (e.g., software as a service (SaaS), application programming interface (API).

Encryption services.

Identity and Access Management (IAM) services.

Examples of utilization of the resources (i.e., resource utilizations) include:

Amount of data being stored.

Amount of time data is stored.

Processing resource utilization (e.g., VM, containers, processors, etc. . . . )

Amount of bandwidth utilized.

Number of calls to a service (e.g., SaaS, API).

Size of data being sent/received during a call to the service.

Cost of any of the aforementioned resource utilizations (and others), i.e., cost of utilizing a certain resource. For example, financial charges by the computing cloud provider for utilization of the resources. Costs may be in a local currency. Cost may be directly considered a resource utilization, for example, a candidate cost pattern of a candidate utilized resource that is similar to a target cost pattern of a target utilized resource is found. Alternatively or additionally, cost may be considered another layer over the resource utilizations. For example, a candidate resource utilization that has a pattern similar to the target resource utilization is found. Costs are determined for the candidate resource utilization and for the target resource utilization.

The target resource utilization may be selected via a graphical user interface (GUI). For example, the GUI presents a list of existing resources utilizations, and the user uses the GUI to click on a certain resource utilization set as the target resource utilization. Alternatively or additionally, the target resource utilization may be automatically selected. For example, the resource utilizations may be analyzed to detect an anomaly. The anomaly may be a value of the resource utilization that exceeds a predicted value and/or exceeds a predefined value (e.g., threshold). The anomaly analysis may be performed, for example, according to a set of rules and/or by a machine learning (ML) model fed values of the resource utilizations where the ML model is trained on a training dataset of records, where a record includes one or more values of a resource utilization labelled with ground truth labels indicating anomaly or not anomaly (e.g., normal). The resource utilization identified as anomalous may be automatically designated as the target resource utilization. In yet another example, the target resource utilization may be automatically iteratively selected from resources being utilized, where in each iteration another candidate resource utilization is selected as the target resource utilization, until all (or selected) pairs of utilized resources are analyzed.

The target resource utilization may be selected from historical data. The architecture described herein may be seamlessly integrated with historical cost data repositories, allowing for the similarity detection to be applied retroactively. This capability may enables entities (e.g., organizations) to analyze past anomalies and/or identify previously unrecognized patterns. By leveraging historical data, a comprehensive view of resource utilization (e.g., cost) behaviors over time may be obtained, for enhancing the accuracy and/or relevance of similarity detections.

At 204, a target delta time-sequence is computed for the target resource utilization.

Optionally, the time-spaced values of the target resource utilization over a time interval are obtained and processed into a structured vector format. The time-spaced values of the target resource utilization may be sorted chronologically, where the vector includes elements that store time consecutive values of the resource utilization. The structured vector format may include the absolute values of the utilized resource.

The time-spaced values may be obtained by a processor querying the resource to obtain the utilization of the resource. In another example, the time-spaced values may be obtained from a dataset that may be populated, for example, by messages published by the resource destined for publication by the dataset where each messages includes the utilization of the resource at a certain time/date.

The time-spaced values of the target resource utilization over the time interval may be represented as a time-series. For example, the amount of cloud storage being utilized may be collected each day, and the time-spaced values include values of the daily amount of used storage over a month in one day intervals. In another example, the time-spaced values of the target resource utilization may include a time-sequence of cost data, indicating costs of utilization the resource at different points in time (e.g., each day, each week, each month, etc. . . . ).

The target delta time-sequence is computed as a sequence of deltas between time-spaced values of the target resource utilization over a time interval, optionally from the vector format that stores consecutive elements that include the time-spaced values. The deltas may be between consecutive time-spaced values. The deltas represent the change between subsequent values at different points in time, for example, computed by taking the difference between neighboring values.

At 206, a target vector representation of the target delta time-sequence may be generated. The target vector representation may be generated by placing the target delta time-sequences into elements of a vector.

Alternatively the target vector representation is simultaneously generated with computation of the target delta time-sequences. For example, a set of absolute values of a respective resource utilization may be transformed into the vector format. Multiple vectors represents absolute values of multiple different resource utilizations may be generated. The vectors may be stored, for example, persistently stored in a columnar data format (e.g., Parquet files), optionally partitioned by time interval (e.g., hour, day, week, month, etc. . . . ), which may support scalable and/or efficient querying. The target delta time-sequence is computed from the vector format that includes the absolute values of the utilized resources. The vector of the delta time-sequence may be computed on-the-fly (i.e., in real time or near real time) from the relevant absolute values vector by calculating differences between consecutive values, as described herein.

The target vector representation of the target delta time-sequence (also referred to herein as a delta vector) may capture the rate and/or direction of the change in the corresponding time-space values of the corresponding resource utilization.

At 208, multiple candidate delta time-sequences are generated.

Each respective candidate delta time-sequence is for a respective corresponding candidate resource utilization of the computing cloud. Each respective candidate delta time-sequence is computed as deltas between time-spaced values of the respective candidate resource utilization over the time interval.

The time-spaced values may be obtained by a processor querying the different resources to obtain the utilization of each respective resource. In another example, the time-spaced values may be obtained from a dataset that may be populated, for example, by messages published by each resource destined for publication by the dataset where each messages includes the utilization of the respective resource at a certain time/date.

At 210, multiple candidate vector representations of the candidate delta time-sequences are generated.

The candidate vector representations may be generated by placing each candidate delta time-sequence into elements of a respective vector. Alternatively the candidate vector representations may be simultaneously generated with computation of the candidate delta time-sequences.

The time-spaced values of the different candidate resources may be processed for generation of the candidate vector representations. For example:

The time-spaced values of the different resources may be aligned with the time-spaced values of the target resource utilization, within a time range corresponding to the time interval over which the time-spaced values of the target resource utilization were obtained.

The time-spaced values of the different resources may be aggregated, for example, by dimension key-value pairs.

Data points determined to be insignificant may be filtered out, for example, resource utilization values below a minimum threshold.

Gaps in elements of the candidate vector representations, such as due to missing values at certain points in time, may be filled with placeholder values to enable computations, for example, zeros.

At 212, multiple similarity measures are computed. Each similarity measure is computed between the target vector representation of the target delta time-sequence and a respective candidate vector representation of the respective candidate delta time-sequence.

The similarity measure may be selected to emphasize pattern similarity while normalizing for differences in absolute magnitude. The similarity measure may be computed by implicitly assigning a greater weight to a multi-dimensional angle between the target vector representation and the respective candidate vector representation and assigning a lower weight to a normal of the target vector representation and/or the respective candidate vector representation. The similarity measure implies a greater weight to a change pattern and less weight to a size of the changes.

Optionally, the similarity measure is implemented as a cosine distance.

The similarity measure may be mathematically represented using the following weighted cosine distance calculation that combines multiple similarity factors:

similarity_score=TRUNC((1−cos_dist_deltas)*100, 4),

Where similarity_score denotes the similarity measure, and cos_dist_deltas denotes the cosine distance between the target vector representation of the target delta time-sequence and one of the candidate vector representations of the candidate delta time-sequence.

The cosine distance may be computed using the following equation:

$$\text{Cosine Distance}(A,B)=1-A(\text{dot})B/\|A\|\|B\|$$

Where A (dot) B represents the dot product of the vectors A and B, and ||A|| ||B|| are the magnitudes (e.g., Euclidean norms) of the vectors.

At 214, absolute vector representations are generated and/or accessed.

A target absolute vector representation of absolute values of the time-spaced values of the target resource utilization (also referred to herein as absolute target time-sequence) may be accessed and/or generated. The target absolute vector representation may be generated, for example, as described with reference to 206 of FIG. 2.

Multiple candidate absolute vector representations of absolute values of the time-spaced values of the candidate resource utilizations (also referred to herein as absolute candidate time-sequence) may be accessed and/or generated. The candidate absolute vector representation may be generated, for example, as described with reference to the generation of the target absolute vector representation of 206 of FIG. 2.

At 216, multiple additional similarity measures may be computed.

Each additional similarity measure may be computed between the target absolute vector representation of the absolute target time-sequence and a respective candidate absolute vector representation of the respective candidate absolute time-sequence.

The additional similarity measures may be computed using the similarity measure described with reference to 212 of FIG. 2.

At 218, multiple combined similarity measures may be computed. Each combined similarity measure is computed for a pair including the target resource utilization and a respective candidate resource utilization.

The combined similarity measure is a combination of the similarity measure between the target vector representation of the target delta time-sequence and the respective candidate vector representation of the respective candidate delta time-sequence, as described with reference to 212 of FIG. 2, and the additional similarity measure between the target absolute vector representation of the absolute target time-sequence and the respective candidate absolute vector representation of the respective candidate absolute time-sequences, as described with reference to 216 of FIG. 2.

The combined similarity measure may be mathematically represented as:

dist_func=cos_dist*cos_dist_deltas, where:

dist_func denotes the combined similarity measure, cost_dist_deltas denotes the similarity measure between the delta time-sequences, and cos_dist denotes the similarity measure between the absolute time-sequences The aforementioned combined similarity measure computed as a multiplication of the absolute vector cosine distance (e.g., as described with reference to 216) and the delta vector cosine distance (e.g., as described with reference to 212) may create a more selective metric in which similarity in both aspects achieve a high overall similarity score.

At 220, one or more vectors may be filtered. It is noted that the filtering of the vectors is not necessarily performed after the computation of the combined similarity measure, but may be performed with respect to one or more features described herein. The filtering may be selectively performed for increasing the accuracy of identifying candidate resource utilizations that have a similar pattern to the target resource utilization, as described herein.

The filtering mechanisms may be selected to help ensure that the results represent meaningful dimensions (e.g., business dimensions) with genuinely similar resource utilization (e.g., cost) behaviors.

Optionally, values of candidate resource utilizations associated with a difference in magnitude below a threshold relative to values of the target resource utilization may be filtered out. For example, according to the equation: max_cost_diff>(max_input_diff/10) AND max_cost_diff>1.

Alternatively or additionally, candidate resource utilizations associated with the similarity measure and/or the additional similarity measure, optionally the combined similarity measure, below a threshold, may be filtered out. For example, according to the equation: cos_dist<0.5 AND cos_dist_deltas<0.5.

Alternatively or additionally, patterns where the dimension value is a numeric value may be excluded, for focusing on categorical dimensions, for example, using the following mathematical operation: toFloat64OrNull(value) IS NULL.

At 222, one or more of the candidate vector representations may be selected.

The candidate vector representation may be selected based on being associated with the similarity measure and/or the combined similarity measure meeting a requirement. For example, the similarity measure is above a threshold value indicating high similarity. In another example, the top predefined number of candidate vector representations with highest similarity measure may be selected.

In yet another example, each similarity measure computed for the candidate vector representations may be categorized into a category selected from multiple categories. Examples of categories include: Identical, Near Identical, High Similarity, Medium Similarity, and Low Similarity. The classification may be based on precise threshold values for values of the similarity measure, optionally cosine distances, selected for providing users with an intuitive understanding of the degree of similarity between different resource utilization patterns. The thresholds used for the classification may be predefined, and/or adapted such as based on user feedback. The categories may simplify the interpretation of complex mathematical relationships. The selection may be performed according to the categories, for example, candidate vector representations associated categories matching the requirement defining at least one category are selected.

Exemplary pseudocode for categorizing values of the similarity measure based on calibrated cosine distance values include:

```
CASE
  WHEN cos_dist_deltas=0 THEN 'Identical'
  WHEN cos_dist_deltas<0.005 THEN 'Near Identical'
  WHEN cos_dist_deltas<0.05 THEN 'High Similarity'
  WHEN cos_dist_deltas<0.15 THEN 'Medium Similarity'
  ELSE 'Low Similarity'
END AS similarity_code
```

The classification categories may be selected for translating mathematical distances into meaningful terms, making the results actionable for analysis and/or decision-making.

At 224, the candidate resource utilization(s) corresponding to the selected candidate vector representations may be provided, optionally presented within the GUI.

The candidate resource utilization(s) may be presented, for example, as a curve between points indicating the time-spaced values of the candidate resource utilization.

Optionally, the time-spaced values of the target resource utilization, optionally a curve thereof, are further presented within the GUI. The time-space values of the target resource utilization, optionally the curve, may be presented as an overlay correlated over the time-spaced values of the candidate resource utilization or curve thereof. The overlay may help visualize the similarity and differences between the two sets of values and/or curves.

The GUI may further present one or more of the following, and/or include one or more of the following features:

- Enrichment with path information for better context.
- Organization into a hierarchical structure.
- Sorting by similarity measure.
- Integration with visualization components for intuitive understanding
- Correlation analytics to help quantify the relationship between the two presents sets of values and/or curves.
- Designed to enable the user to navigate to a detailed analysis of the candidate resource utilization.
- Contextual information for the candidate resource utilization.

At 226, one or more other actions may be implemented according to the selected candidate resource utilization.

Optionally, an event tag is generated for the selected candidate resource utilization. The event tag may be used, for example, as a reference point for further analysis of the selected candidate resource utilization, such as to help determine the cause of the pattern of the selected candidate resource utilization.

Alternatively or additionally, the selected candidate resource utilization and/or the target resource utilization may be automatically analyzed, such as to determine the cause of anomalous behavior. For example, the time-sequences of values of the selected candidate resource utilization and/or the target resource utilization may be fed into a ML model trained to analyze pairs of similar time sequences of values of two or more resource utilizations, such as to identify possible causes. The ML model may be trained on a training dataset of records, where each record includes sample time sequences of values of two or more sample resource utilizations determined to be similar using embodiments described herein, labelled with a ground truth label of the cause. The ML model may be implemented using a suitable architecture, for example, a neural network, a transformer neural network, a recurrent neural network, and the like.

Alternatively or additionally, the selected candidate resource utilization may be automatically analyzed to identify anomalous patterns, for example, using a ML model trained to detect anomalies and/or according to a set of rules.

Alternatively or additionally, utilization rules may be automatically generated and/or implemented. For example, to limit utilization of the target resource and/or the selected candidate resource such as to below a threshold. Utilizations above the threshold may be automatically blocked and/or prevented from being implemented, and/or may trigger an alert such as on a display of an administrative terminal.

At 228, one or more features described with reference to 202-228 may be implemented.

The iterations may be performed for different target resource utilizations, and/or over different time intervals, such as for historic time intervals and/or dynamically using current real time intervals.

The target resource utilization may be iteratively and/or automatically selected from available resource utilizations. During each iteration, another resource utilization is defined as the target resource utilization, the iterations terminate when the similarity measure is computed for a defined amount of pairs of the resource utilizations, for example, all possible combinations of pairs.

The following are exemplary features for improving a computing device that executes the method described with reference to FIG. 2, for example, by reducing utilization of processing resources, reducing processing time, and/or reducing data storage requirements:

- Input validation and preprocessing optimize the vector representation.
- Query optimization selects the most efficient data retrieval strategy.
- Parallel processing of vector calculations accelerates comparison operations.
- Results filtering and ranking occur in memory for maximum performance.
- The final result set is returned to the presentation layer for presentation within the GUI.

Referring now back to FIG. 3, an exemplary user interface 302 (e.g., GUI) presents an anomaly alert 304 in a utilization of a resource. For example, as shown, the resource utilization is a “Cost per Customer” 306, and an anomaly 308 is a cost anomaly where the expected cost was $101 but the actual cost was $138 representing an increase of $37 or 36%. User interface may present a visual indication 310 of the pattern of the resource utilization which led to the alert, for example, a curve (or other graph) indicating values of the resource utilization over a time interval.

Referring now back to FIG. 4, an exemplary user interface 402 (e.g., GUI) presents candidate resource utilizations 404 and 406 having patterns similar to the resource utilization depicted in FIG. 3, as described herein. The user interface 402 may present, for example, the candidate user interface 408 (e.g., Dimension), an indication of amount of similarity 410, and/or a visual indication 412 indicating the pattern of the candidate resource utilization, optionally presented similar to visual indication 310 of the resource utilization of FIG. 3.

Referring now back to FIG. 5, an exemplary user interface 502 (e.g., GUI) may present values 504 of one of the candidate resources identified as being highly similar to the resource utilization, for example, candidate resource 404 of FIG. 4. Values 504 may be presented over a time interval corresponding to the time interval presented for the resource utilization in which the anomaly was identified as described with reference to FIG. 3. An event tag 506 may be generated automatically and/or manually for an anomaly 508 detected in values 504 of the candidate resource.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant computing clouds will be developed and the scope of the term computing cloud is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of analyzing resource utilization in at least one computing cloud, comprising:

receiving a target resource utilization selected from a plurality of resource utilizations of at least one computing cloud, by at least one of via a graphical user interface (GUI) and automatic selection, wherein the target resource utilization is automatically selected in response to automatically detecting an anomaly of resource utilization that exceeds a predicted value or exceeds a predefined value;

generating a target delta time-sequence by computing a plurality of deltas between a plurality of time-spaced values of the target resource utilization over a time interval;

computing a target vector representation of the target delta time-sequence;

generating a plurality of candidate delta time-sequence for each of a plurality of candidate resource utilizations of the at least one computing cloud, each candidate delta time-sequence computed as a plurality of deltas between a plurality of time-spaced values of the candidate resource utilization over the time interval;

computing a plurality of candidate vector representations of the plurality of candidate delta time-sequences, wherein each of the target vector representation and the plurality of candidate vector representations denote a rate of change and/or a direction of change of the corresponding time-space values of the corresponding resource utilization;

computing a plurality of similarity measures, each similarity measure between the target vector representation and a respective candidate vector representation;

selecting at least one of the candidate vector representations associated with the similarity measure meeting a requirement; and presenting on a display and within the GUI, at least one candidate resource utilization of the plurality of candidate resource utilizations corresponding to the selected at least one of the candidate vector representations.

2. The computer implemented method of claim 1, wherein the similarity measure is computed by implicitly assigning a greater weight to a multi-dimensional angle between the target vector representation and the respective candidate vector representation and assigning a lower weight to a normal of the target vector representation and/or the respective candidate vector representation, which implies a greater weight to a change pattern and less weight to a size of the changes.

3. The computer implemented method of claim 1, wherein the similarity measure comprises a cosine distance.

4. The computer implemented method of claim 3, wherein the similarity measure is mathematically represented as:

similarity_score=TRUNC((1−cos_dist_deltas)*100, 4), wherein similarity_score denotes the similarity measure, and cos_dist_deltas denotes the cosine distance between the target vector representation and one of the plurality of candidate vector representations.

5. The computer implemented method of claim 1, further comprising:

computing a target absolute vector representation of absolute values of the plurality of time-spaced values of the target resource utilization;

computing a plurality of candidate absolute vector representations of absolute values of the plurality of time-spaced values of the candidate resource utilizations;

computing a second similarity measure between the target absolute vector representation and the plurality of candidate absolute vector representations, wherein the similarity measure comprises a first similarity measure;

computing a combined similarity measure as a combination of the first similarity measure and the second similarity measure, wherein comprises selecting at least one of the candidate vector representations associated with the combined similarity measure meeting a second requirement.

6. The computer implemented method of claim 5, wherein the combined similarity measure is mathematically represented as:

dist_func=cos_dist*cos_dist_deltas, wherein:

dist_func denotes the combined similarity measure,
cos_dist denotes the second similarity measure, and
cost_dist_deltas denotes the first similarity measure.

7. The computer implemented method of claim 1, wherein the plurality of deltas are between consecutive time-spaced values.

8. The computer implemented method of claim 1, further comprising classifying each similarity measure of the plurality of similarity measures into a category of a plurality of categories, wherein the at least one candidate vector representation associated with the category matching the requirement defining at least one category is selected and presented.

9. The computer implemented method of claim 1, wherein the target resource utilization is iteratively selected from the plurality of resource utilizations, wherein during each iteration another resource utilization is defined as the target resource utilization, wherein the iterations terminate when the similarity measure is computed for a defined amount of pairs of the plurality of resource utilizations.

10. The computer implemented method of claim 1, further comprising filtering out values of candidate resource utilizations associated with a difference in magnitude below a threshold relative to values of the target resource utilization.

11. The computer implemented method of claim 1, further comprising filtering out candidate resource utilizations associated with the similarity measure below a threshold.

12. The computer implemented method of claim 1, further comprising:

generating an event tag for the candidate resource utilization corresponding to the at least one candidate resource utilization of the plurality of candidate resource utilizations corresponding to the selected at least one of the candidate vector representations.

13. The computer implemented method of claim 1, further comprising presenting within the GUI, an overlay of the plurality of time-spaced values of the target resource utilization time correlated with the plurality of time-spaced values of the selected at least one candidate resource utilization.

14. The computer implemented method of claim 1, wherein the resource associated with the target resource utilization is of a different type than the resource associated with the selected candidate resource utilization.

15. The computer implemented method of claim 1, wherein the plurality of time-spaced values of the target resource utilization and the plurality of time-spaced values of the candidate resource utilization are obtained by a processor querying each respective resource to obtain the corresponding utilization of the respective resource.

16. The computer implemented method of claim 1, wherein each of the target resource utilization and the plurality of candidate resource utilizations comprises a cost of using a certain resource.

17. A system for analyzing resource utilization in at least one computing cloud, comprising:

at least one processor executing a code for:

receiving a target resource utilization selected from a plurality of resource utilizations of at least one computing cloud, by at least one of via a graphical user interface (GUI) and automatic selection, wherein the target resource utilization is automatically selected in response to automatically detecting an anomaly of resource utilization that exceeds a predicted value or exceeds a predefined value;

generating a target delta time-sequence by computing a plurality of deltas between a plurality of time-spaced values of the target resource utilization over a time interval;

computing a target vector representation of the target delta time-sequence;

generating a plurality of candidate delta time-sequence for each of a plurality of candidate resource utilizations of the at least one computing cloud, each candidate delta time-sequence computed as a plurality of deltas between a plurality of time-spaced values of the candidate resource utilization over the time interval;

computing a plurality of candidate vector representations of the plurality of candidate delta time-sequences, wherein each of the target vector representation and the plurality of candidate vector representations denote a rate of change and/or a direction of change of the corresponding time-space values of the corresponding resource utilization;

computing a plurality of similarity measures, each similarity measure between the target vector representation and a respective candidate vector representation;

selecting at least one of the candidate vector representations associated with the similarity measure meeting a requirement; and presenting on a display and within the GUI, at least one candidate resource utilization of the plurality of candidate resource utilizations corresponding to the selected at least one of the candidate vector representations.

18. A non-transitory medium storing program instructions for analyzing resource utilization in at least one computing cloud, comprising program instructions which when executed by at least one processor, cause the at least one processor to:

receive a target resource utilization selected from a plurality of resource utilizations of at least one computing cloud, by at least one of via a graphical user interface (GUI) and automatic selection, wherein the target resource utilization is automatically selected in response to automatically detecting an anomaly of resource utilization that exceeds a predicted value or exceeds a predefined value;

generate a target delta time-sequence by computing a plurality of deltas between a plurality of time-spaced values of the target resource utilization over a time interval;

compute a target vector representation of the target delta time-sequence;

generate a plurality of candidate delta time-sequence for each of a plurality of candidate resource utilizations of the at least one computing cloud, each candidate delta time-sequence computed as a plurality of deltas between a plurality of time-spaced values of the candidate resource utilization over the time interval;

compute a plurality of candidate vector representations of the plurality of candidate delta time-sequences, wherein each of the target vector representation and the plurality of candidate vector representations denote a rate of change and/or a direction of change of the corresponding time-space values of the corresponding resource utilization;

compute a plurality of similarity measures, each similarity measure between the target vector representation and a respective candidate vector representation;

select at least one of the candidate vector representations associated with the similarity measure meeting a requirement; and present on a display and within the GUI, at least one candidate resource utilization of the plurality of candidate resource utilizations corresponding to the selected at least one of the candidate vector representations.

* * * * *